US012789544B2

(12) United States Patent
Tasaka

(10) Patent No.: US 12,789,544 B2
(45) Date of Patent: Nov. 10, 2026

(54) INKJET RECORDING APPARATUS

(71) Applicant: KYOCERA Document Solutions Inc., Osaka (JP)

(72) Inventor: Shimon Tasaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 137 days.

(21) Appl. No.: 19/011,448

(22) Filed: Jan. 6, 2025

(65) Prior Publication Data

US 2025/0229558 A1 Jul. 17, 2025

(30) Foreign Application Priority Data

Jan. 11, 2024 (JP) ................................ 2024-002306

(51) Int. Cl.
*B41J 2/045* (2006.01)
*B41J 29/377* (2006.01)

(52) U.S. Cl.
CPC ......... *B41J 29/377* (2013.01); *B41J 2/04553* (2013.01); *B41J 2/04563* (2013.01); *B41J 2/04586* (2013.01)

(58) Field of Classification Search
CPC ................ B41J 2/04553; B41J 2/04563; B41J 2/04586; B41J 2/1408; B41J 2/175; B41J 2/17596; B41J 29/377; B05C 11/10
See application file for complete search history.

(56) References Cited

U.S. PATENT DOCUMENTS 5,402,160 A * 3/1995 Kadowaki ........... F28D 15/0275 174/15.2
8,382,231 B2 * 2/2013 Takano .................. B41J 2/1632 347/18

FOREIGN PATENT DOCUMENTS

JP 2004-058477 A 2/2004

* cited by examiner

*Primary Examiner* — Anh T Vo
(74) *Attorney, Agent, or Firm* — Studebaker Brackett PLLC

(57) ABSTRACT

An inkjet recording apparatus includes a tank, a pump, an inkjet head, a radiator, a blower, a flow pass, a head temperature measuring part, an outside air temperature measuring part, and a control part. The tank stores a cooling liquid. The pump feeds the cooling liquid. The inkjet head ejects ink. The radiator cools the cooling liquid. The blower blows air to the radiator. Along the flow pass, the cooling liquid circulates through the tank, the pump, the inkjet head, and the radiator. The head temperature measuring part measures a temperature of the inkjet head. The outside air temperature measuring part measures an outside air temperature. The control part controls a flow rate of the pump according to a temperature of the inkjet head measured by the head temperature measuring part and an outside air temperature measured by the outside temperature measuring part.

6 Claims, 6 Drawing Sheets

FIG. 6

| | HEAD TEMPERATURE, OUTSIDE AIR TEMPERATURE | | | | F/Fmax[%] |
|---|---|---|---|---|---|
| | X＜Tmin | Tmin≦X＜Ti | Ti≦X＜Tmax | Tmax≦X | |
| 1st STATE | | | | To,Th | 100 |
| 2nd STATE | | | Th | To | (100+(Ti/Th)×100)/2 |
| 3rd STATE | | | To | Th | CONSTANT VALUE (LESS THAN 100) |
| 4th STATE | | | To,Th | | (100+(Ti/Th)×100)/2 |
| 5th STATE | | To | | Th | (100+(Ti/Th)×100)/2 |
| 6th STATE | | To | Th | | (100+(Ti/Th)×100)/2 |
| 7th STATE | | Th | To | | (100+(Ti/To)×100)/2 |
| 8th STATE | To,Th | | | | 0 |

INKJET RECORDING APPARATUS

INCORPORATION BY REFERENCE

This application is based on and claims the benefit of priority from Japanese patent application No. 2024-002306 filed on Jan. 11, 2024, which is incorporated by reference in its entirety.

BACKGROUND

The present disclosure relates to an inkjet head and an inkjet recording apparatus.

In order to obtain a good image quality in an inkjet recording apparatus, it is necessary to keep ink at a proper viscosity. Since a viscosity of the ink varies with a temperature of the ink, a proper temperature range is determined for each product. However, there is a case where a temperature of the ink exceeds the upper limit of the proper temperature range due to heat generation of a driving circuit for driving an inkjet head. Therefore, a technique for cooling the inkjet head has been studied. For example, there is a configuration in which a temperature of the driving circuit for driving the inkjet head is measured and the driving circuit is cooled according to the measured temperature.

Incidentally, when a liquid-cooled cooling device is used, a flow pass for circulating a cooling liquid through the inkjet head, a radiator for cooling the cooling liquid, and a blower for blowing air to the radiator are provided. A cooling capacity of the radiator varies depending on an air temperature outside the inkjet recording apparatus. In the above-described configuration, since the outside air temperature is not taken into consideration, there is a possibility that the cooling capacity becomes excessive or insufficient due to the outside air temperature, and the temperature of the ink deviates from the proper temperature range.

SUMMARY

An inkjet recording apparatus according to the present disclosure includes a tank, a pump, an inkjet head, radiator, a blower, a flow pass, a head temperature measuring part, an outside air temperature measuring part, and a control part. The tank stores a cooling liquid. The pump feeds the cooling liquid. The inkjet head ejects ink. The radiator cools the cooling liquid. The blower blows air to the radiator. Along the flow pass, the cooling liquid circulates through the tank, the pump, the inkjet head, and the radiator. The head temperature measuring part measures a temperature of the inkjet head. The outside air temperature measuring part measures an outside air temperature. The control part controls a flow rate of the pump according to a temperature of the inkjet head measured by the head temperature measuring part and an outside air temperature measured by the outside temperature measuring part.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 6 is a diagram showing a relationship between a head temperature and an outside air temperature, and a flow rate ratio according to the embodiment of the present disclosure.

DETAILED DESCRIPTION

Hereinafter, with reference to the drawings, an inkjet recording apparatus 1 according to one embodiment of the present disclosure will be described.

Figure 1:
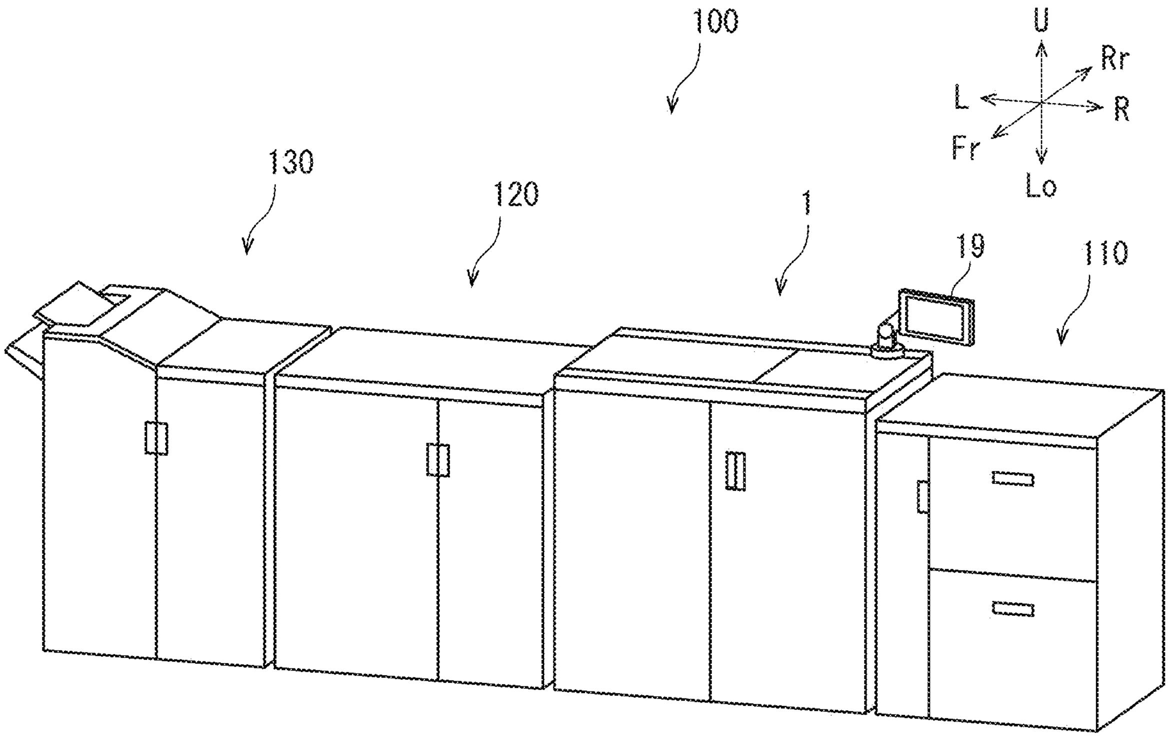
FIG. 1 is a perspective view showing an appearance of an image forming system according to a first embodiment of the present disclosure.
Figure 2:
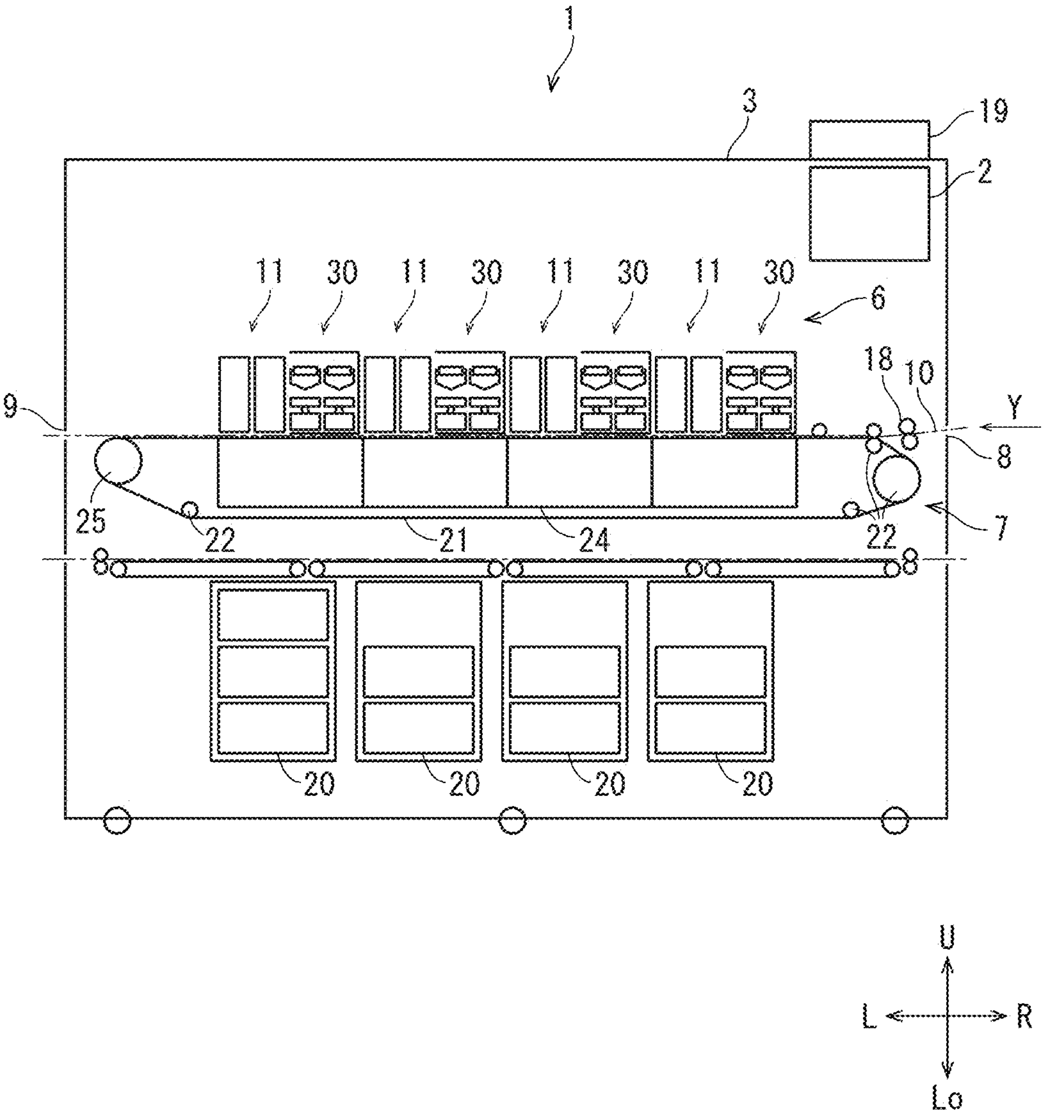
FIG. 2 is a front view schematically showing an internal structure of the inkjet recording apparatus according to the first embodiment of the present disclosure.
Figure 3:
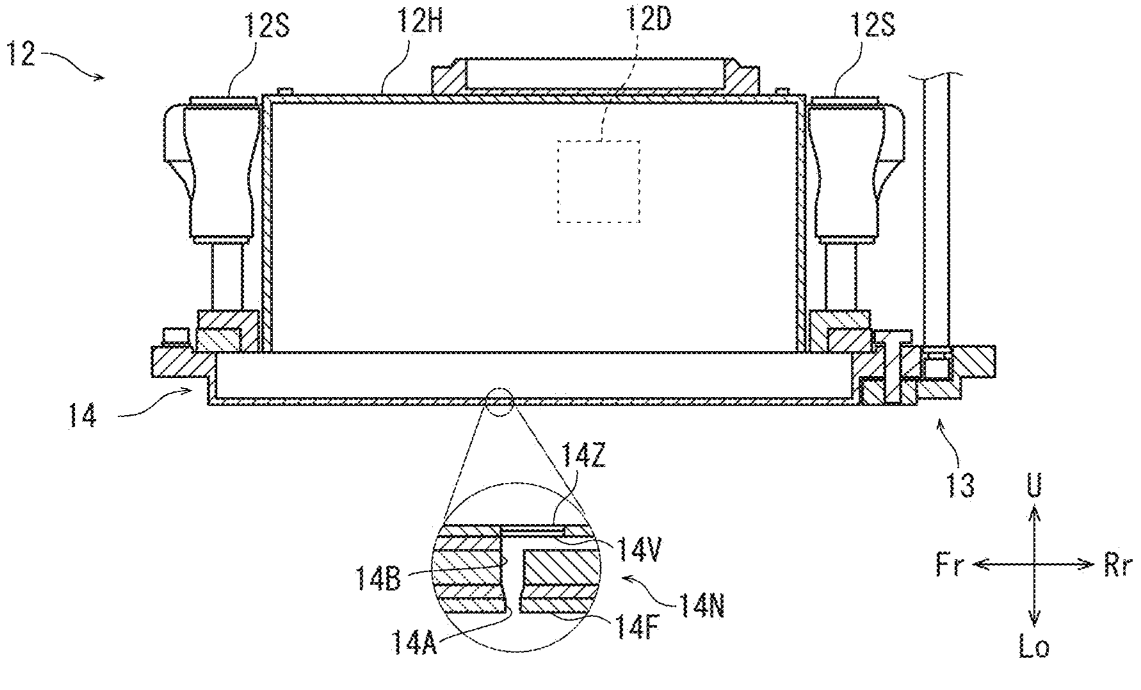
FIG. 3 is a cross-sectional view showing an inkjet head, in the inkjet recording apparatus according to the embodiment of the present disclosure.

FIG. 1 is a perspective view showing the appearance of the image forming system 100. FIG. 2 is a front view schematically showing an internal structure of the inkjet recording apparatus 1. FIG. 3 is a cross-sectional view showing an inkjet head 12. Hereinafter, the front side of the paper plane on which FIG. 2 is drawn will be referred to as the front side of the inkjet recording apparatus 1, and the left-and-right direction will be described with reference to the direction in which the inkjet recording apparatus 1 is viewed from the front side. In each figure, U, Lo, L, R, Fr, and Rr indicate an upper, lower, left, right, front, and rear, respectively.

The image forming system 100 (see FIG. 1) includes a sheet feeding device 110, an inkjet recording apparatus 1, a drying device 120, and a post-processing device 130. The sheet feeding device 110 stores several thousand sheets, and feeds the sheets to the inkjet recording apparatus 1. The inkjet recording apparatus 1 forms an image on the sheet by an inkjet method. The drying device 120 heats the sheet conveyed from the inkjet recording apparatus 1 to dry the ink. The post-processing device 130 performs post-processing such as punching, stapling, folding, or the like on the sheet conveyed from the drying device 120.

The inkjet recording apparatus 1 (see FIG. 2) includes a box-shaped body housing 3. In the center portion inside the body housing 3, a conveying unit 7 which attracts and conveys the sheet in the Y direction is provided. Above the conveying unit 7, an image forming unit 6 which forms an image by ejecting ink is provided. On the right side surface of the body housing 3, a sheet feeding port 8 through which the sheet is introduced from the sheet feeding device 110 is provided. On the left side surface of the body housing 3, a discharge port 9 through which the sheet on which the image is formed is discharged to the drying device 120 is provided. Inside the body housing 3, a conveyance path 10 is provided from the sheet feeding port 8 to the discharge port 9 between the conveying unit 7 and the image forming unit 6. A registration roller 18 is provided on the upstream side of the conveying unit 7 in the conveyance direction Y.

The conveying unit 7 includes an endless conveying belt 21 and a suction part 24. The conveying belt 21 has a large number of air holes (not shown), and is wound around a driving roller 25 and a driven roller 22. The upper surface of the suction part 24 has a large number of air holes (not shown), and is in contact with the inner surface of the conveying belt 21. The suction part 24 sucks air through the air holes of the conveying belt 21 and the air holes of the suction part 24, thereby attracting the sheet to the conveying belt 21. When the driving roller 25 is driven in the counterclockwise direction by a driving part (not shown) including a motor and a reduction gear, the conveying belt 21 travels in the counterclockwise direction, and the sheet attracted to the conveying belt 21 is conveyed in the Y direction.

The image forming unit 6 includes a plurality (in this embodiment, four) of head units 11. The head unit 11 includes one or more (in this embodiment, three) inkjet heads 12. Ink containers 20 filled with black, cyan, magenta and yellow inks are connected to the head units 11.

The inkjet head 12 (see FIG. 3) includes a rectangular housing 12H whose longitudinal direction is along in the front-and-rear directions, a nozzle plate 14 provided at the bottom of the housing 12H, and a socket 12S to which a pipe for supplying the ink is connected. The nozzle plate 14 includes a large number of nozzles 14N arranged in the front-and-rear direction. The nozzle 14N includes a branch flow pass 14B branched from the downstream side of the socket 12S, and an ejection port 14A provided on a nozzle surface 14F which is a lower surface of the nozzle plate 14. A diaphragm 14V also serves as a part of the inner wall of the branch flow pass 14B. The diaphragm 14V is provided with a pressurizing element 14Z. As the pressurizing element 14Z, a piezoelectric element, an electrostatic actuator, a heater, or the like is used. A driving circuit 12D for driving the pressurizing element 14Z is connected to the pressurizing element 14Z.

The control part 2 (see FIG. 2) includes an arithmetic part and a storage part (not shown). The arithmetic part is, for example, a CPU (Central Processing Unit). The storage part includes a storage medium such as a ROM (Read Only Memory), a RAM (Random Access Memory), an EEPROM (Electrically Erasable Programmable Read Only Memory), and the like. The arithmetic part reads out the control program stored in the storage part and executes various processes. The control part 2 may be implemented by an integrated circuit that does not use software.

A display operation part 19 is provided on the upper portion of the body housing 3 (see FIG. 1 and FIG. 2). The display operation part 19 includes a display panel, a touch panel laminated on the display panel, and a keypad (not shown). The control part 2 displays a screen representing an operation menu, a status, or the like of the inkjet recording apparatus 1 on the display panel, and controls each part of the inkjet recording apparatus 1 in accordance with an operation detected by the touch panel and the keypad.

The basic image forming operation of the inkjet recording apparatus 1 is as follows. When an image forming job is inputted to the inkjet recording apparatus 1 from the display operation part 19 or an external computer, the sheet feeding device 110 feeds the sheet to the conveyance path 10 through the sheet feeding port 8, and the registration roller 18 whose rotation is stopped corrects the skew of the sheet. When the registration roller 18 sends the sheet to the conveying unit 7 at a predetermined timing, the conveying unit 7 attracts the sheet to the conveying belt 21 and conveys the sheet in the Y direction. The ink is ejected from the inkjet head 12 to form an image on the sheet. The sheet on which the image is formed is discharged to the drying device 120 through the discharge port 9.

Figure 4:
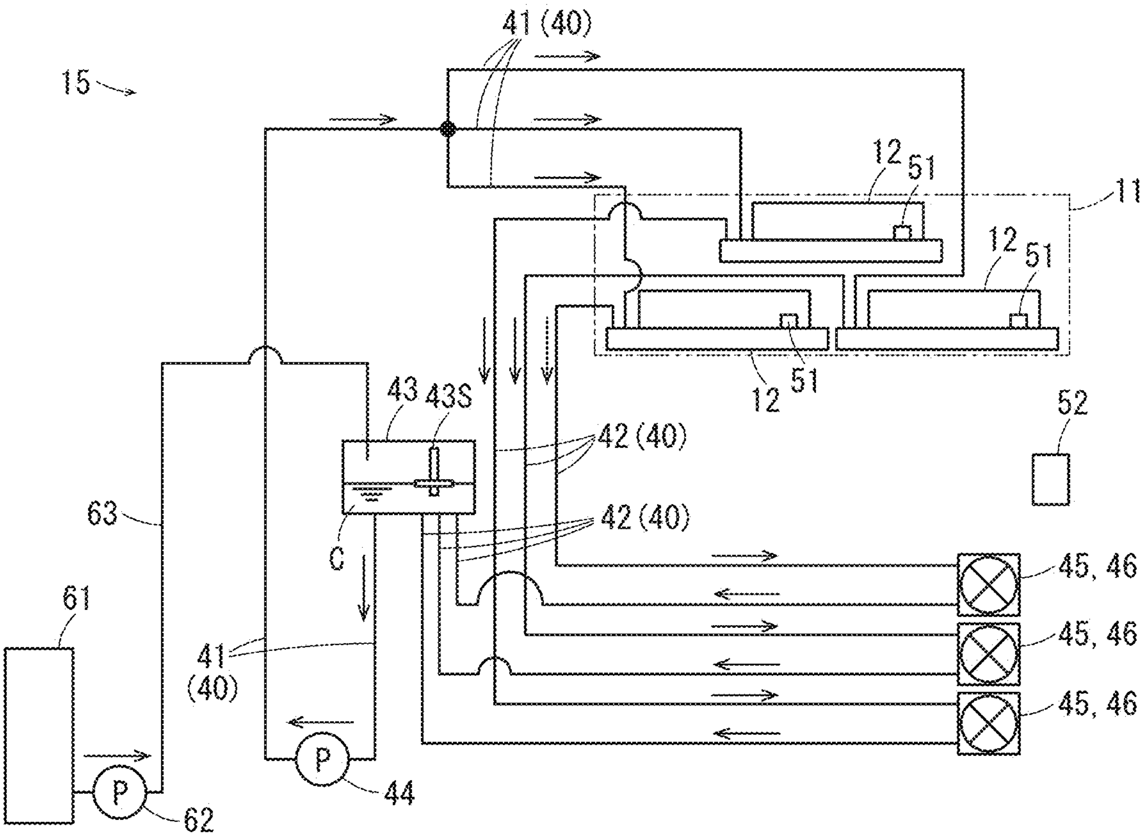
FIG. 4 is a piping system diagram of a cooling device according to the embodiment of the present disclosure.
Figure 5:
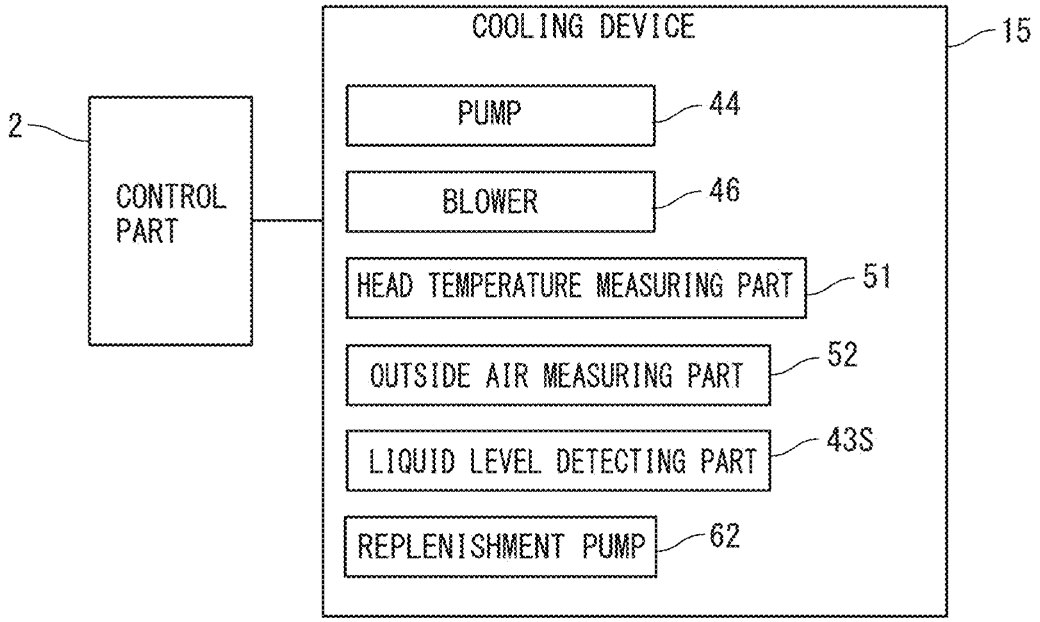
FIG. 5 is a block diagram showing an electric configuration of the cooling device according to the embodiment of the present disclosure.

[Cooling Device] FIG. 4 is a piping system diagram of a cooling device 15. FIG. 5 is a block diagram showing the electrical configuration of the cooling device 15. FIG. 4 show one cooling device 15 corresponding to one head unit 11, but actually, the similar cooling device 15 is provided for each head unit 11.

The inkjet recording apparatus 1 according to the present embodiment includes a tank 43 in which a cooling liquid C is stored, a pump 44 which feeds the cooling liquid C, the inkjet head 12, a radiator 45 which cools the cooling liquid C, a blower 46 which blows air to the radiator 45, a flow pass 40 along which the cooling liquid C is circulated through the tank 43, the pump 44, the inkjet head 12, and the radiator 45, a head temperature measuring part 51 which measures a temperature Th of the inkjet head 12, an outside air temperature measuring part 52 which measures an outside air temperature To, and the control part 2 which controls a flow rate F of the pump 44 according to a temperature Th of the inkjet head 12 and an outside air temperature To. Concretely, it is as follows.

[Tank] A replenishment tank 61 and a replenishment pump 62 are connected to the tank 43 via a supply flow pass 63. The replenishment pump 62 is, for example, a turbo pump or a gear pump. The tank 43 is provided with a liquid level detecting part 43S. The liquid level detecting part 43S includes, for example, a floating body and a sensor for detecting a position of the floating body in the upper-and-lower direction. The liquid level detecting part 43S detects a height of the liquid level of the cooling liquid C in the tank 43, and outputs data indicating the height of the liquid level to the control part 2. The control part 2 operates the replenishment pump 62 so as to replenish the cooling liquid C from the replenishment tank 61 to the tank 43 so that a height of the liquid level is maintained within a predetermined range.

[Pump] The pump 44 is, for example, a turbo pump or a gear pump. The pump 44 feeds the cooling liquid C from the tank 43 to the inkjet head 12.

[Flow Pass, Radiator] The flow pass 40 includes a supply flow pass 41 for supplying the cooling liquid C from the tank 43 to the inkjet head 12 and a recovery flow pass 42 for recovering the cooling liquid C from the inkjet head 12 to the tank 43. The supply flow pass 41 extends from the tank 43 to the pump 44, and then is branched into three passes on the downstream side of the pump 44, and the branched three passes extend to the inkjet heads 12. A radiator 45 is provided for each inkjet head 12. The recovery flow pass 42 extends from the inkjet head 12*s* to the tank 43 via the radiators 45. The blower 46 introduces air from the outside of the inkjet recording apparatus 1 and blows the air to the radiator 45. The cooling liquid C whose temperature is increased by the heat generation of the driving circuit 12D of the inkjet head 12 is cooled by the radiator 45.

[Head Temperature Measuring Part] The head temperature measuring part 51 is, for example, a thermistor and a thermocouple, and is provided in each inkjet head 12. The head temperature measuring part 51 measures a temperature (hereinafter, it is referred to as the head temperature Th) of the inkjet head 12, and outputs data indicating the head temperature Th to the control part 2.

[Outside Air Temperature Measuring Part] The outside air temperature measuring part 52 is, for example, a thermistor and a thermocouple, and is provided in the body housing 3 of the inkjet recording apparatus 1. The outside air temperature measuring part 52 measures a temperature of air outside the inkjet recording apparatus 1 (hereinafter referred to as the outside air temperature To), and outputs data indicating the outside air temperature To to the control part 2.

Next, the operation of the cooling device 15 will be described. The control part 2 controls the cooling device 15 according to a control program showing a control procedure of the cooling device 15. The control program describes an algorithm for determining a flow rate ratio of the pump 44 according to a head temperature Th and an outside air temperature To. The flow rate ratio is a ratio F/Fmax of a flow rate F to the maximum flow rate Fmax of the pump 44.

FIG. 6 shows the relationship between a flow rate ratio F/Fmax, and a head temperature Th and an outside air temperature To. The upper limit temperature Tmax and the lower limit temperature Tmin in the proper temperature range are the temperatures at which the ink properties change. The change in the ink properties causes ink ejection failure of the inkjet head 12 and white stripes in the image. The target temperature Ti within the proper temperature range is, for example, ½ of the sum of the upper limit temperature Tmax and the lower limit temperature Tmin.

In this example, the head temperature Th and the outside air temperature To are divided into four categories. The four categories contain: the upper limit temperature Tmax or higher, the target temperature Ti or higher and less than the upper limit temperature Tmax, the lower limit temperature Tmin or higher and less than the target temperature Ti, and less than the lower limit temperature Tmin. The head temperature Th and the outside air temperature To are classified into the first to eighth states according to which category the head temperature Th and the outside air temperature To correspond.

In the first state, both the outside air temperature To and the head temperature Th are equal to or higher than the upper limit temperature Tmax. In the second state, the outside air temperature To is equal to or higher than the upper limit temperature Tmax, and the head temperature Th is equal to or higher than the target temperature Ti and less than the upper limit temperature Tmax. In the third state, the outside air temperature To is equal to or higher than the target temperature Ti and less than the upper limit temperature Tmax, and the head temperature Th is equal to or higher than the upper limit temperature Tmax. In the fourth state, both the outside air temperature To and the head temperature Th are equal to or higher than the target temperature Ti and less than the upper limit temperature Tmax. In the fifth state, the outside air temperature To is equal to or higher than the lower limit temperature Tmin and less than the target temperature Ti, and the head temperature Th is equal to or higher than the upper limit temperature Tmax. In the sixth state, the outside air temperature To is equal to or higher than the lower limit temperature Tmin and less than the target temperature Ti, and the head temperature Th is equal to or higher than the target temperature Ti and less than the upper limit temperature Tmax. In the seventh state, the outside air temperature To is equal to or higher than the target temperature Ti and less than the upper limit temperature Tmax, and the head temperature Th is equal to or higher than the lower limit temperature Tmin and less than the target temperature Ti. In the eighth state, both the outside air temperature To and the head temperature Th are less than the lower limit temperature Tmin.

The flow rate ratio F/Fmax is determined for each of the above states. The flow rate ratio F/Fmax in the first state is 100%. The flow rate ratio F/Fmax of the second, fourth, fifth and sixth states is expressed by equation (1).

$$F/F\mathrm{max}=(100+(Ti/Th)\times 100)/2 \qquad \text{Equation(1).}$$

The flow rate ratio F/Fmax of the third state is a constant value of less than 100%. The flow rate ratio F/Fmax in the seventh state is expressed by Equation (2).

$$F/F\mathrm{max}=(100+(Ti/To)\times 100)/2 \qquad \text{Equation(2)}$$

The flow rate ratio F/Fmax in the eighth state is 0%, and the pump 44 is stopped.

Figure 7:
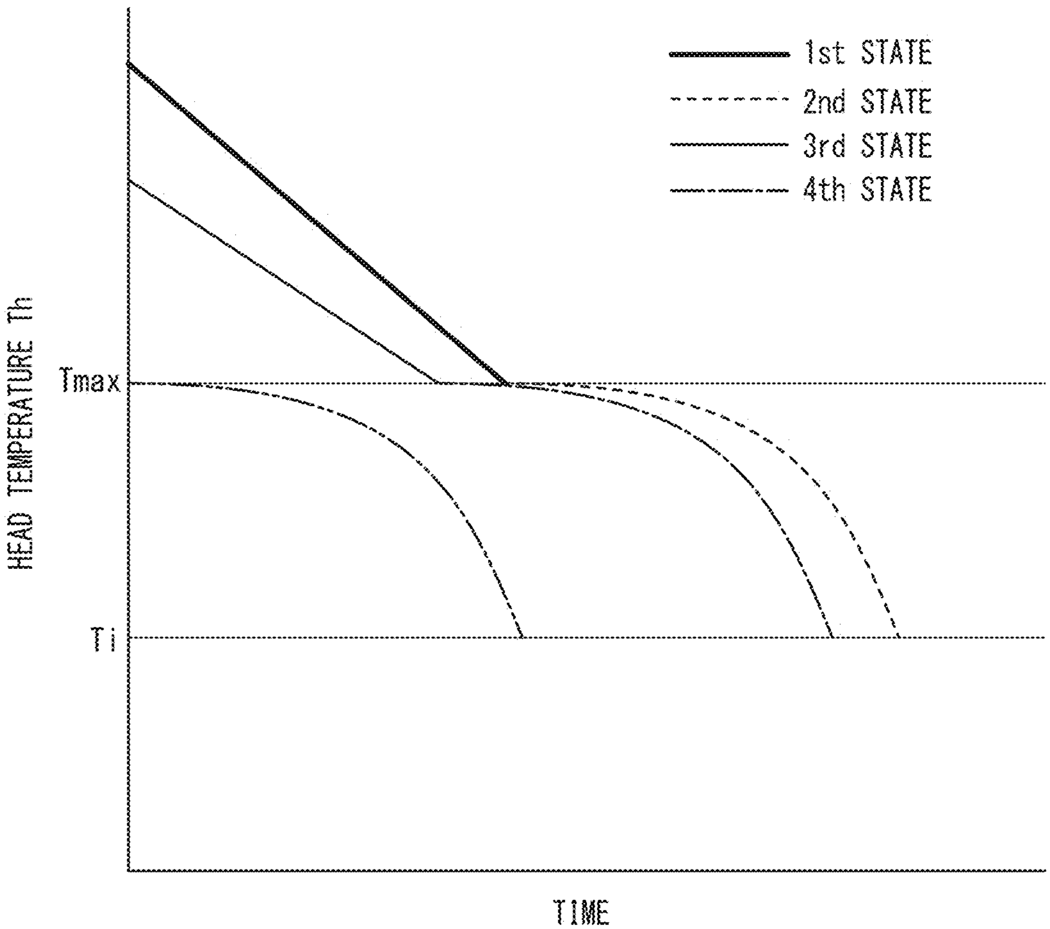
FIG. 7 is a diagram showing a change with time of the head temperature according to the embodiment of the present disclosure.

FIG. 7 is a diagram showing a change of the head temperature Th with time. FIG. 7 shows the first to fourth states as an example. In the first and third states, since the flow rate ratio F/Fmax is constant, the head temperature Th decreases at a substantially constant rate. This is because priority is given to quickly lowering the head temperature Th.

In the third state, since the flow rate ratio F/Fmax is lower than that in the first state, the head temperature Th decreasing speed is slow. This is because in the third state, since the outside air temperature To is lower than in the first state, the head temperature Th may decrease too rapidly and the image quality may become unstable at the same flow rate ratio F/Fmax as in the first state.

On the other hand, in the second and fourth states, as shown by Equation (1), the flow rate ratio F/Fmax increases as the head temperature Th decreases, so that the head temperature Th decreases gradually near the upper limit temperature Tmax, but the speed of the decreasing increases as the head temperature Th decreases. By making the decreasing of the initial head temperature Th gradually, the rapid temperature decreasing of the ink is suppressed, so that the image quality can be stabilized.

The above description shows an example in which the transition from the first state to the second state and the transition from the third state to the fourth state are realized by the progress of cooling. On the other hand, when the head temperature Th is equal to or less than the upper limit temperature Tmax in the initial state, Equation (1) is applied from the beginning, and the head temperature Th decreases as shown by the dashed line in FIG. 7.

In the fifth state, since the outside air temperature To is lower than the head temperature Th, Equation (1) is applied. This is because, according to the specification of the water cooling mechanism, a temperature of air blown to the radiator 45 at the time of cooling is the outside air temperature To, and therefore, as a difference between the outside air temperature To and the head temperature Th is large, a rapid temperature change may occur to the ink. By using Equation (1), since the flow rate ratio F/Fmax is set by referring to a ratio between the head temperature Th and the target temperature Ti, the rapid temperature change to the ink can be prevented. Since the head temperature Th and the outside air temperature To are close to the target temperature Ti in the sixth and seventh states, the temperature is equalized by increasing the flow rate ratio F/Fmax.

The inkjet recording apparatus 1 according to the present embodiment described above includes the tank 43 in which the cooling liquid C is stored, the pump 44 which feeds the cooling liquid C, the inkjet head 12, the radiator 45 which cools the cooling liquid C, the blower 46 which blows air to the radiator 45, the flow pass along which the cooling liquid C circulates through the tank 43, the pump 44, the inkjet head 12 and the radiator 45, the head temperature measuring part 51 which measures a temperature Th of the inkjet head 12, the outside air temperature measuring part 52 which measures an outside air temperature To, and the control part 2 which controls a flow rate F of the pump 44 according to a temperature Th of the inkjet head 12 measured by the head temperature measuring part 51 and an outside air temperature To measured by the outside air temperature measuring part 52.

Since the driving circuit 12D of the inkjet head 12 generates heat, the inkjet head 12 needs to be cooled in order to maintain a temperature of the ink within the proper temperature range. However, since an amount of heat generated by the driving circuit 12D varies according to an image density, a head temperature Th also varies. Therefore, it is necessary to adjust the cooling capacity according to the head temperature Th, because in the case of the water-cooled cooling device 15, the cooling capacity of the radiator 45 varies according to an outside air temperature To. The, due to the outside air temperature To, the cooling capacity becomes excessive or insufficient, and the ink temperature may deviate from the proper temperature range. According to the present embodiment, since the flow rate F of the pump 44 is controlled according to an outside air temperature To, the cooling capacity when the inkjet head 12 is cooled by the liquid-cooling method can be adjusted according to the outside air temperature To.

According to the inkjet recording apparatus 1 according to the present embodiment, the control part 2 increases the flow rate F of the pump 44 as the outside air temperature To is higher. According to this configuration, it is possible to suppress the lowering of the cooling capacity of the radiator 45 when the outside air temperature To becomes high.

According to the inkjet recording apparatus 1 according to the present embodiment, the control part 2 sets the flow rate F of the pump 44 to the maximum flow rate Fmax when the temperature Th and the outside air temperature To of the inkjet head 12 are equal to or higher than the upper limit temperature of the proper ink temperature range. According to this configuration, when the temperature Th and the outside air temperature To of the inkjet head 12 are equal to or higher than the upper limit temperature of the proper ink temperature range, the inkjet head 12 can be cooled with the maximum cooling capacity.

According to the inkjet recording apparatus 1 according to the present embodiment, the control part 2 sets the flow rate F of the pump 44 to be less than the maximum flow rate Fmax when at least one of the temperature Th of the inkjet head 12 and the outside air temperature To is less than the upper limit temperature of the proper temperature range. According to this configuration, since the cooling speed becomes slower than that in the case where the flow rate F of the pump 44 is the maximum flow rate Fmax, the rapid temperature decreasing of the ink is suppressed, and the image quality can be stabilized.

According to the inkjet recording apparatus 1 according to the present embodiment, when the temperature Th of the inkjet head 12 is less than the upper limit temperature of the proper temperature range, the control part 2 increases the flow rate F of the pump 44 as the temperature Th of the inkjet head 12 is lower. According to this configuration, the cooling progresses slowly in the beginning of the cooling, and the cooling speed increases as the cooling progresses. Therefore, the initial rapid temperature decreasing is suppressed, and the image quality can be stabilized.

According to the inkjet recording apparatus 1 according to the present embodiment, the control part 2 stops the pump 44 when the temperature Th of the inkjet head 12 and the outside air temperature To are less than the lower limit temperature of the proper temperature range of ink. According to this configuration, energy can be saved when the cooling is not required.

The above embodiments may be modified as follows.

Equation (1) is only an example of a calculation formula for increasing the flow rate F of the pump 44 as the temperature Th of the inkjet head 12 is lower, and a calculation formula including an exponential function or a quadratic function may be used. Equation (2) is only an example of a calculation formula for increasing the flow rate F of the pump 44 as the outside air temperature To is lower, and a calculation formula including an exponential function or a quadratic function may be used.

The invention claimed is:

1. An inkjet recording apparatus comprising:
- a tank in which a cooling liquid is stored;
- a pump which feeds the cooling liquid;
- an inkjet head which ejects ink;
- a radiator which cools the cooling liquid;
- a blower which blows air to the radiator;
- a flow pass along which the cooling liquid circulates through the tank, the pump, the inkjet head, and the radiator;
- a head temperature measuring part which measures a temperature of the inkjet head;
- an outside air temperature measuring part which measures an outside air temperature; and
- a control part which controls a flow rate of the pump according to a temperature of the inkjet head measured by the head temperature measuring part and an outside air temperature measured by the outside temperature measuring part.

2. The inkjet recording apparatus according to claim 1, wherein
- the control part increases the flow rate of the pump as the outside air temperature is high.

3. The inkjet recording apparatus according to claim 2, wherein
- the control part sets the flow rate of the pump to a maximum flow rate when the temperature of the inkjet head and the outside air temperature are equal to or higher than an upper limit temperature of a proper temperature range of the ink.

4. The inkjet recording apparatus according to claim 2, wherein
- the control part sets the flow rate of the pump to be less than a maximum flow rate when at least one of the temperature of the inkjet head and the outside air temperature is less than an upper limit temperature of a proper temperature range of the ink.

5. The inkjet recording apparatus according to claim 4, wherein
- the control part increases the flow rate of the pump as the temperature of the inkjet head is lower when the temperature of the inkjet head is less than the upper limit temperature of the proper temperature range.

6. The inkjet recording apparatus according to claim 2, wherein
- the control part stops the pump when the temperature of the inkjet head and the outside air temperature are less than a lower limit temperature of the proper temperature range of the ink.

* * * * *